(12) United States Patent
Gunasekaran

(10) Patent No.: US 8,206,155 B2
(45) Date of Patent: Jun. 26, 2012

(54) TRIGONOMETRY TEACHING AID SYSTEM

(75) Inventor: Keerthi Gunasekaran, Shakopee, MN (US)

(73) Assignee: Keerthi Gunasekaran, Eden Prairie, MN (US)

( * ) Notice: Subject to any disclaimer, the term of this patent is extended or adjusted under 35 U.S.C. 154(b) by 467 days.

(21) Appl. No.: 12/456,217

(22) Filed: Jun. 13, 2009

(65) Prior Publication Data

US 2010/0316981 A1    Dec. 16, 2010

(51) Int. Cl.
*G09B 23/04* (2006.01)
(52) U.S. Cl. ......................................................... 434/211
(58) Field of Classification Search .................. 434/188, 434/211, 213, 214, 215; 235/61 GM; 33/453, 33/456, 458
See application file for complete search history.

(56) References Cited

U.S. PATENT DOCUMENTS

| | | | |
|---|---|---|---|
| 378,257 A | 2/1888 | Leschorn | |
| 570,157 A * | 10/1896 | Edmiston | 33/456 |
| 1,541,179 A * | 6/1925 | Parkinson | 434/215 |
| 1,894,886 A * | 1/1933 | Paskowski | 33/453 |
| 1,955,392 A | 4/1934 | Shimberg | |
| 2,509,301 A * | 5/1950 | Henry, Sr. | 434/215 |
| 2,701,096 A * | 2/1955 | Wattier | 235/61 GM |
| 2,736,491 A * | 2/1956 | Potter | 235/61 GM |
| 3,322,340 A | 5/1967 | Grantland | |
| 3,339,297 A * | 9/1967 | Stinn et al. | 434/190 |
| 3,347,458 A * | 10/1967 | Thiel | 235/88 M |
| 3,359,653 A | 12/1967 | Redfern | |
| 3,414,190 A * | 12/1968 | Lemiesz | 235/61 GM |
| 3,556,397 A | 1/1971 | Andersen | |
| 3,663,732 A * | 5/1972 | Polk | 434/214 |
| 3,814,903 A * | 6/1974 | Jankowiak | 235/61 GM |
| 3,826,021 A | 7/1974 | Andrea | |
| 3,827,163 A * | 8/1974 | Grimes | 434/215 |
| 3,835,298 A * | 9/1974 | DeAndrea | 235/61 GM |
| 4,417,399 A * | 11/1983 | Baliozian | 33/448 |
| 4,435,162 A * | 3/1984 | Schoenwald | 434/215 |
| 4,655,714 A * | 4/1987 | Djali | 434/211 |
| 5,114,347 A * | 5/1992 | Camp | 434/214 |
| 5,215,467 A * | 6/1993 | Brischke | 434/214 |
| 5,732,474 A | 3/1998 | Cannon | |
| 5,873,729 A * | 2/1999 | Aghevli | 434/211 |
| 6,132,217 A * | 10/2000 | Dickson | 434/211 |
| 7,278,217 B1 | 10/2007 | Mills | |
| 7,748,129 B2 * | 7/2010 | Kozlowski | 33/453 |
| 7,942,675 B1 * | 5/2011 | Errthum | 434/211 |

* cited by examiner

*Primary Examiner* — Kurt Fernstrom

(57) ABSTRACT

The present invention provides a teaching aid system (10) for assisting students in applying trigonometric classroom lessons in real life applications both in indoor and outdoor settings. The teaching aid system consists of a pivoting scope (16) and an asymmetrically weighing gravity dial (18) that are pivotally mounted to a pair of support members (12). A tape measure (42) and an arithmetic electronic calculator (46) are attached on the support members (12) to enable students compute trigonometric formulations and applications of the same, when utilizing the system for real life objects either in indoor or outdoor settings. For determining dimensions of viewed objects, the student determines the distance from the viewed object using the tape measure (42), and the angles between the top and bottom of the viewed object using the scope (16) and gravity dial (18). Then applying the proper trigonometric formulae from a booklet or other conventional trigonometric formulae sources, the student can determine the height, elevations or slopes of objects.

8 Claims, 9 Drawing Sheets

TRIGONOMETRY TEACHING AID SYSTEM

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND

1. Field of the Invention

The present invention relates to teaching devices and, in particular, to a teaching aid system for assisting students and users apply trigonometric lessons in real life applications.

2. Prior Art

In teaching young students, particularly those of advanced stature as early as elementary school, Applicant has found that the thirst and assimilation of classroom knowledge is enhanced by providing the opportunity to apply the lessons in ways related to daily experiences and observations.

In U.S. Pat. No. 5,732,474 issued to Cannon (1998), illustrates two dimensional nomographic device that uses the angular relationship between the moving arm and the angular scale. Two independent transparent slide indicators are mounted below the chart board one of which slides in the horizontal direction and is marked with an opaque vertical indicating line, the other of which slides in the vertical direction and is marked with an opaque horizontal line. There are no provisions in the device to actually enable the user to apply the trigonometric relationship to real time objects.

In U.S. Pat. No. 7,278,217 to Mills (2007), the aid comprises of a vertical support member and two semi-circular protractors, the protractors have same quadrant angulations preventing accurate angulations which extend beyond 180 degrees. The aid also does not allow 360 degree swivel of a simple barrel scope and angular inclination measurements, also the aid does not all allow 360 degree measurements. The aid needs setup and level adjustment, before taking measurements as it lacks angulations self alignment on any plane. It cannot self align its angulations to automatically indicate true horizontal and vertical.

The aid has a level that the user needs to refer to align to the horizontal before taking any measurements, also using the attached level increases chance of parallax errors and other inaccuracies. The aid has no resting means or supports, it may be only used as a handheld which will further the inherent inaccuracies. If the aid is used on uneven ground it can increase reading errors. The aid also highly depends on other external measurement gages such as a yard stick or tape measure for ground level or distance measurements. It is not a stand alone device and does not allow a user to learn all aspects of trigonometric ratios which involve cyclic gyrations.

In U.S. Pat. No. 3,322,340 issued to Frantland (1967) the instrument teaches the triangulations using trigonometric functions such as sine, tan and cosine but lacks the ability to engage the user to apply what he has learnt in simple manner. The invention comprises of a protractor scale and a vernier alignable therewith and operative in combination with a pair of micrometers, each having a vernier dial associated therewith and operated to indicate accurate calculations. The invention is primarily for the purpose of measuring geometrical figures as right-angle triangles, equiangular or equilateral triangles, isosceles triangles, and other polygonal figures when they can be broken down to right-angles triangles and when one side or more factor of right-angled triangle is known. The device is used as an instrument for triangulations and is not proposed to be used as a teaching aid or an educational device due to its complexity and inability to directly apply trigonometric relationships in real time.

In U.S. Pat. No. 1,955,392 issued to Shimberg (1934) the invention a trigonometric teaching device is used to demonstrate the changes in the trigonometric functions to angle changes by using a swinging member on a chart. The invention comprises of a swingable member, forming one movable side of the angle in connection with a suitable chart, properly ruled, and inscribed with a stationary line giving the other side of the angle whereby variations of the line functions corresponding to variations of an angle are illustrated on the chart. The invention uses a swinging member on a connected chart to animate the angular displacement; it does not associate it to any real time entity. The tool in its presented form lacks the application aspect altogether.

In U.S. Pat. No. 3,826,021 issued to Andrea (1974) is another two dimensional trigonometric visual demonstration tool that has a planar member having a unit circle inscribed with angulations. The planar member also includes a vertically extending, ordinate corridor, defined by the ordinate axis and scale associated shows the numerical values corresponding to secant, cosecant and other trigonometric functions. A transparent cursor member having a radius vector hairline is pivotally mounted at the origin of the unit circle. The device does not enable any application of trigonometric measurements on real time applications.

Similar U.S. Pat. No. 378,257 issued to Leschorn (1888), U.S. Pat. No. 3,359,653 issued to Redfern (1967), U.S. Pat. No. 3,556,397 issued to Anderson (1971) comprise of a pivoting arm or slide rulers attached to chart or protractor angulations. These inventions are for a student to understand the trigonometric relations in a class room and do not allow the learner to use them in real world or real world applications.

All the above invention's angular displacements need a point of reference and or a reference plane for angular displacement beyond the capability of the attached reference charts or connected planes. Also, the devices such as stated above lack the apparatus to enable them to automatically refer to true horizontal and vertical axis or plane of devices.

BRIEF SUMMARY OF THE INVENTION

The present invention provides a teaching aid system for assisting students, particularly young children, in applying trigonometric classroom lessons in real life applications both in indoor and outdoor settings. The teaching aid system consists of a pivoting scope and an asymmetrically weighing gravity dial that are pivotally mounted at the top of a pair of support members. A tape measure and electronic arithmetic calculator are attached on the support members to provide students solve trigonometric formulations with the system when using it to measure real life objects either in indoor or outdoor settings. For determining dimensions of viewed objects, the student determines the distance from the viewed object using the tape measure, and the angles between the top and bottom of the viewed object using the scope and gravity dial. Then applying the proper trigonometric formulae from a booklet or other conventional sources, the student can determine the height, elevations or slopes of objects.

Accordingly, it is an object of the present invention to provide a teaching aid system for enhancing trigonometric knowledge.

Another object is to provide a teaching apparatus allowing a student to determine physical aspects of structures using trigonometric lessons.

Another object is to provide a simple viewing device enabling students to comprehend trigonometric teachings in real life applications.

BRIEF DESCRIPTION OF THE DRAWINGS

The above and other features of the invention will become apparent upon reading the following description taken in conjunction with the accompanying drawing in which.

DRAWINGS-Reference Numerals

Figure 1:
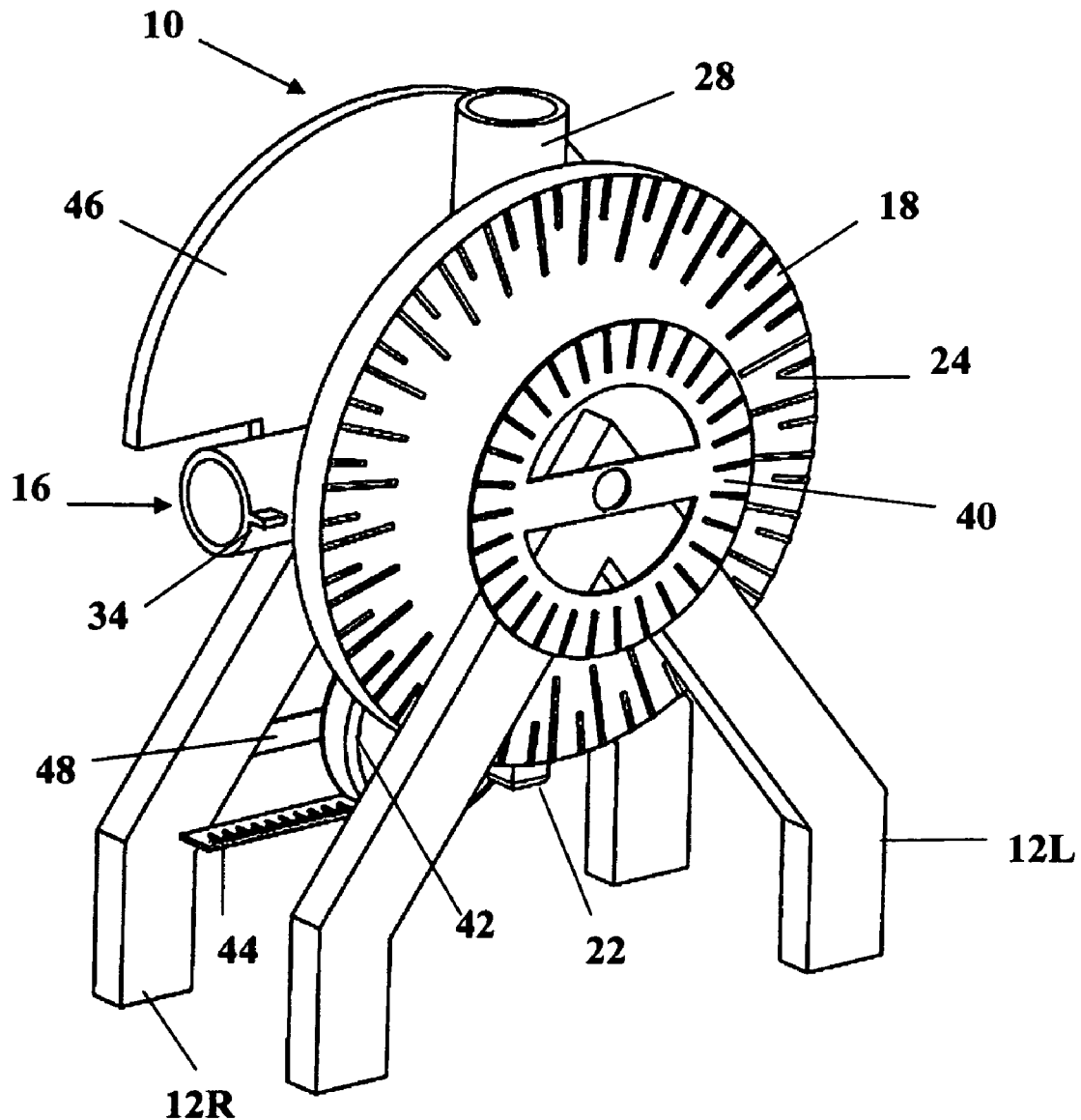
FIG. 1 shows the left orthogonal view of the system.

10 Teaching Aid System
12L Left Forked Support Member
12R Right Forked Support Member
14 Cylindrical Through Hole
16 Scope
18 Gravity Dial
20 Circular hole
22 Elongated Weight
24 Short Graduation
26 Primary Tube
28 Secondary Tube
30L Left Shaft
30R Right Shaft
32 Canted Slot
34 Peg
36 Image Branching Medium
38 Longitudinal Axis
40 Circular Protractor
42 Tape Measure
44 Tape Line
46 Arithmetic Calculator
48 Bracket
50 Single Tube Scope

DETAILED DESCRIPTION OF THE PREFERRED EMBODIMENT

Referring to the drawings for the purpose of describing the preferred embodiment and not for limiting the same, FIGS. 1, 2, 3 and 6 illustrates the preferred embodiment of a trigonometric teaching aid system 10 for providing students and users with real life applications of the principles of trigonometry. FIG. 7 illustrates the alternate embodiment of the system.

The teaching aid system 10 comprises of a pair of forked planar upright support members 12L and 12R. All the elements of the embodiment are supported by support members 12L and 12R and are described in detail below. Both 12L and 12R on their top ends have a transverse cylindrical through hole 14. A scope 16 and an asymmetrically weighing gravity dial 18 are pivotally connected between 12L & 12R and are explained in detail below.

Figure 4:
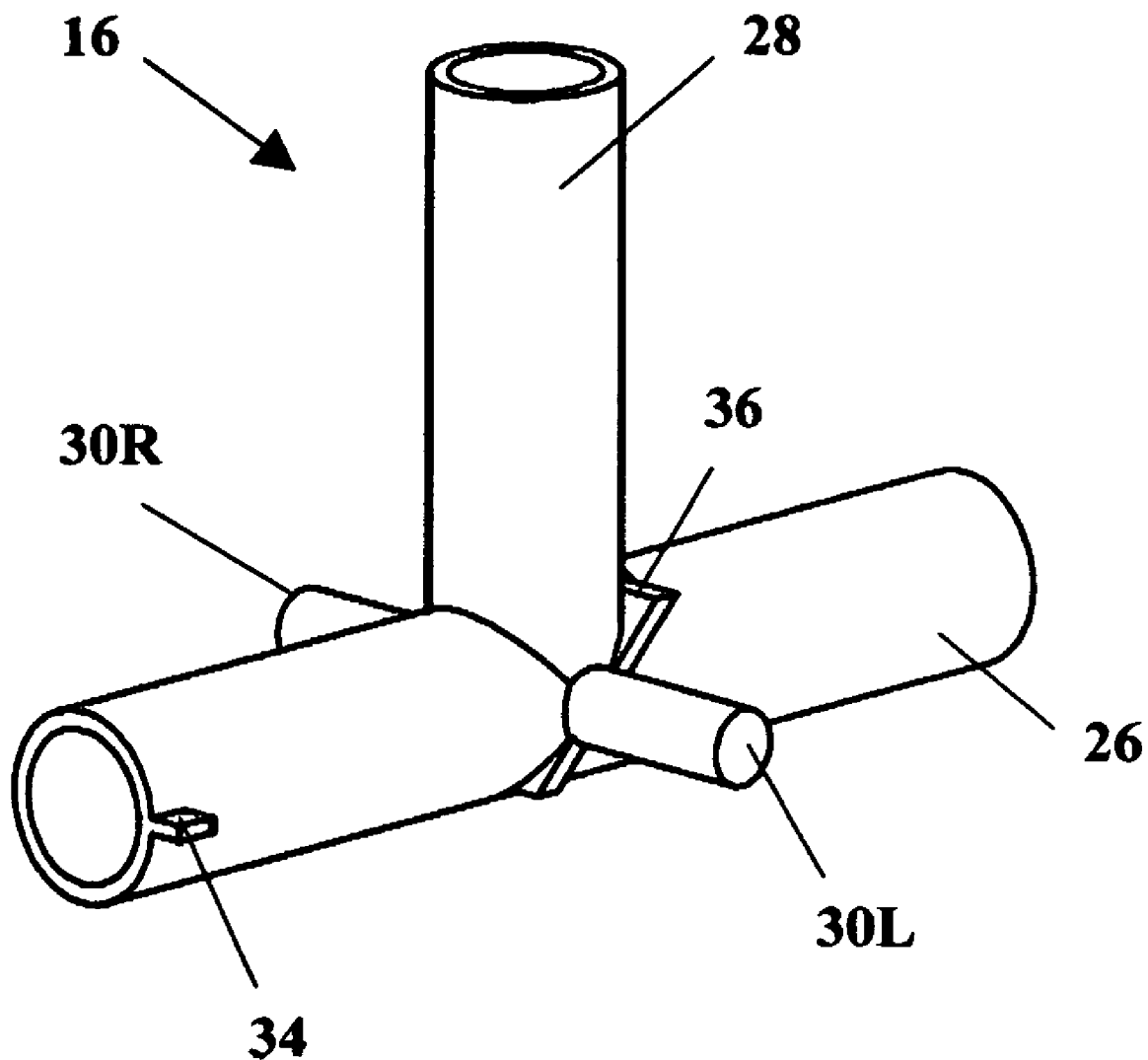
FIG. 4 shows the left orthogonal view of the scope.
Figure 5:
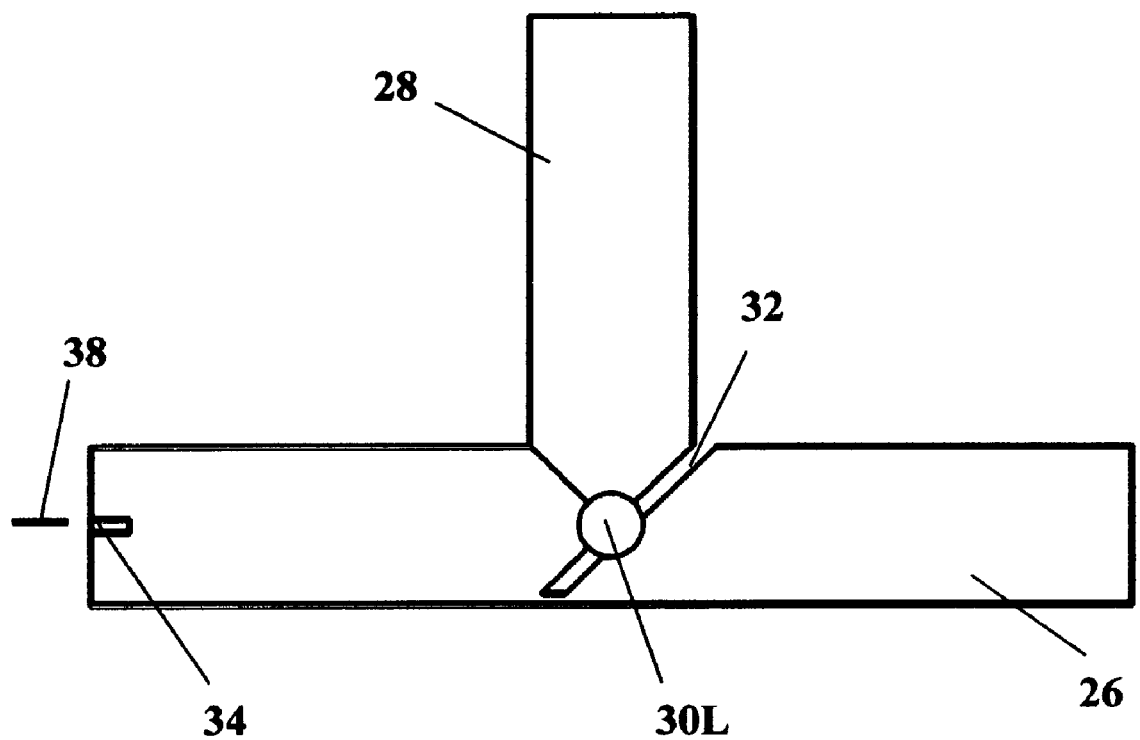
FIG. 5 shows the left side view of the scope.

With reference to FIGS. 4 and 5, scope 16 comprises of a long hollow primary tube 26 with a longitudinal axis 38 a shorter hollow secondary tube 28, an image dispersing medium 36, a peg 34 and a shaft with two ends 30L and 30R on the left and right respectively. One end of hollow secondary tube 28 is perpendicularly inserted at the center of primary tube 26. Tubes 26 and 28 have the same inner and outer diameters. A canted slot 32 is cutout on primary tube 26 right below the joining of secondary tube 28.

The tubes are currently made of plastic and are adhesively attached. They can also be injection molded as one piece using conventional injection molding techniques. An image-branching medium 36 made of a semi-reflective glass sheet is inserted snugly in slot 32 cut in primary tube 26. The acute angle between the plane of medium 36 and primary tube's longitudinal axis 38 is 45 degree caused by the canted arrangement of the slot. The purpose of the branching medium is to optically branch, including, partially reflecting an image beam passing through primary tube 26 to secondary tube 28. This arrangement enables a user per their preference to easily view a target of interest either through the back end of primary tube 26 or through the top open end of secondary tube 28. This arrangement also increases the usability of the system when it is resting on a ground level or if the user has to bend forward to view a target of interest using scope 16. An elongated glass prism can also be used as an image-brancing medium to optically branch the image with minor adjustments to the linearity of the scope and the slot dimensions.

From the center or mid region of scope 16, on primary tube 26 extends out a transverse shaft with two ends 30L and 30R on the left and right sides respectively. The shaft is perpendicular to both primary tube 26 and secondary tube 28 and is permanently attached at their intersection region on 26 using adhesives. The extremities of 30L and 30R are pivotally mounted on support members 12L and 12R respectively and positioned between them. The diameter of the shaft is slightly smaller than the diameter of hole 14 enabling the shaft to be pivotally inserted to it. This allows 16 to swivel a full 360 degrees; freely between support members 12L and 12R. A simpler version of the scope can also be made by just having one hollow primary tube and no interconnecting secondary tube.

Figure 3:
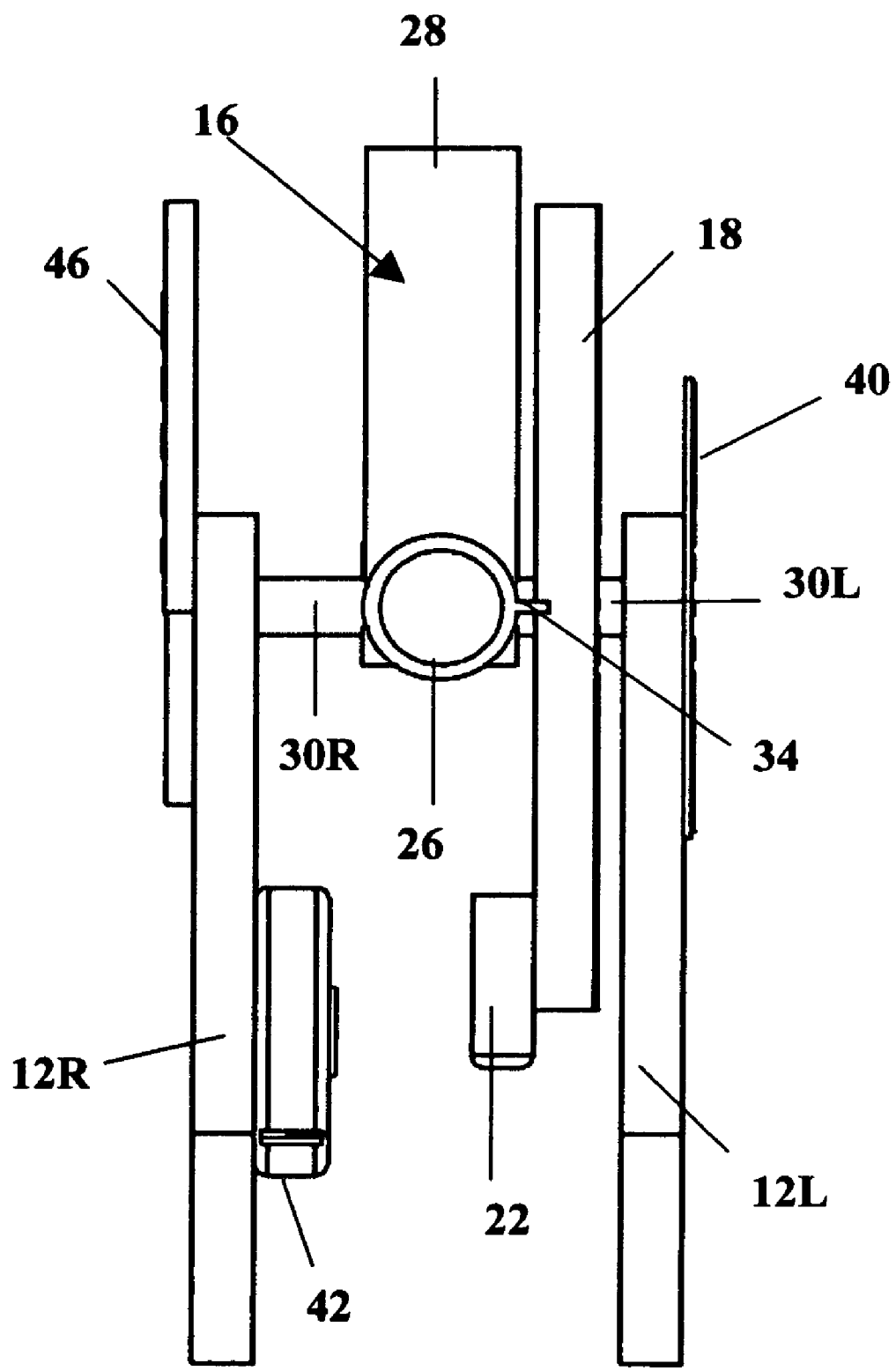
FIG. 3 shows the front view of the system.
Figure 6:
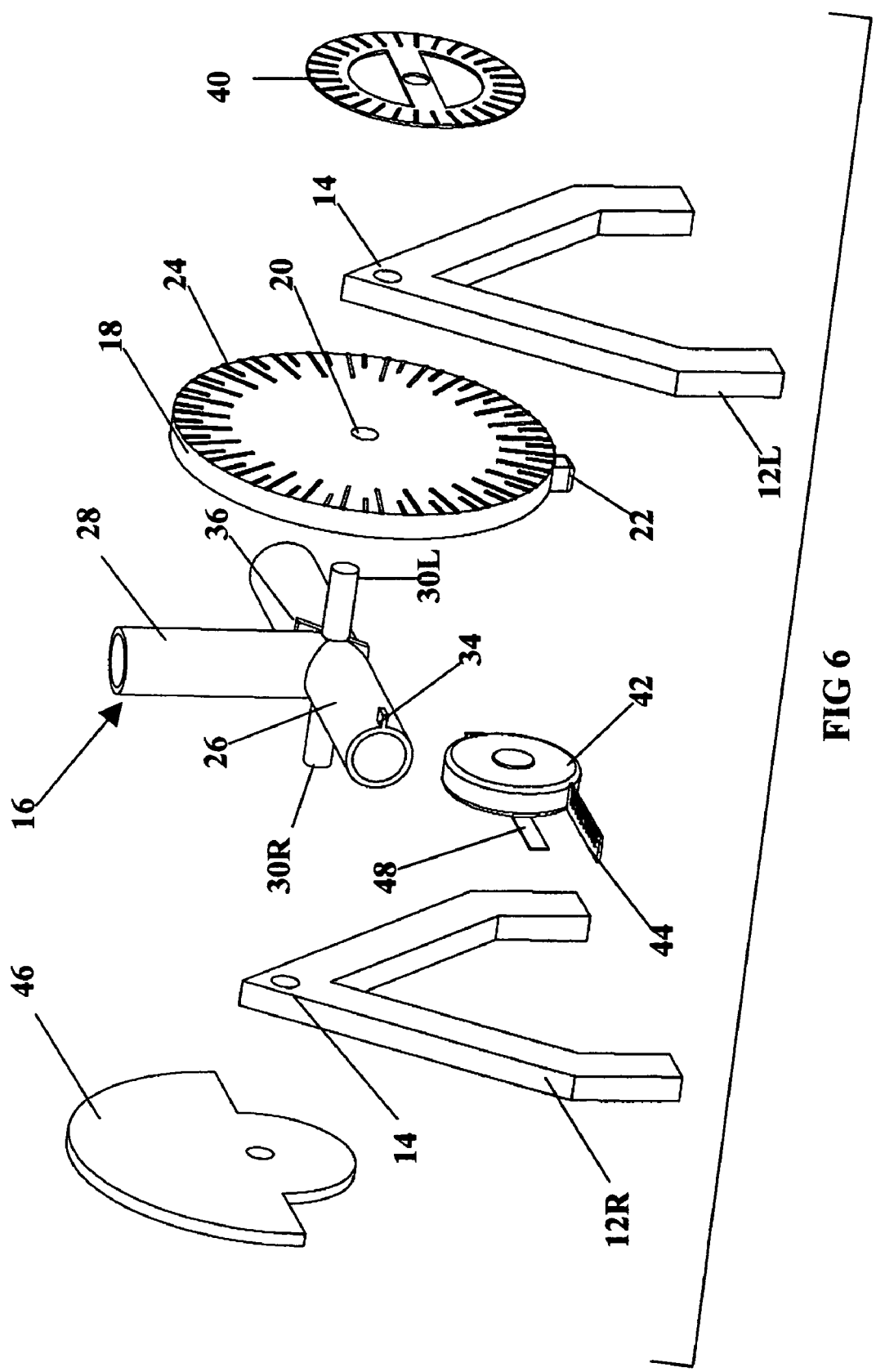
FIG. 6 shows the exploded view of the system.
Figure 7:
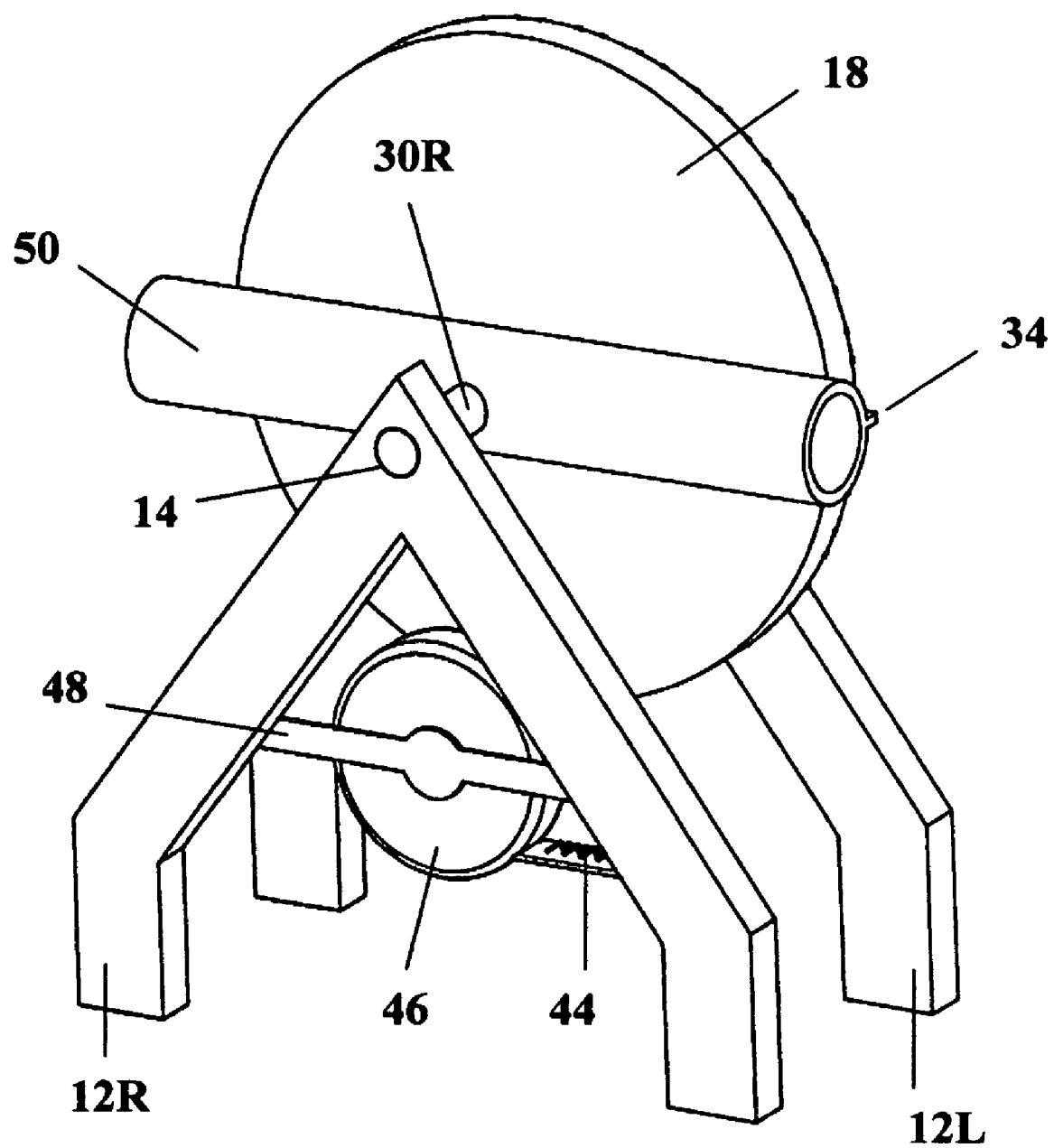
FIG. 7 shows an alternative embodiment of the system.

With reference to FIGS. 1, 3 and 6, asymmetrically weighing gravity dial 18 is made of a flat dial, having a circular hole 20 in its diametric center; and its diameter is slightly larger than the diameter of shaft 30L. Gravity dial 18 is pivotally mounted on 30L in between 12L and 26. It can also be pivotally mounted between 12R and 26. A short elongated weight 22 is radially mounted on gravity dial 18 as shown in FIGS. 1, 3 and 6. The asymmetrical weight distribution caused by weight 22 on dial 18, gives it a pendulum effect when it is pivotally attached to 30L, and allows it to reproducibly orient to gravity to attain equilibrium. Dial 18 has equally spaced short graduations 24 on its outer surface along its circumference to indicate angulations. The radius of dial 18 is shorter than half the length of primary tube 26. The dial helps a user to align scope 16 to the actual horizontal level irrespective to the system's resting or carrying plane.

With reference to FIGS. 1, 4 and 5, peg 34 is adhesively attached on the outer surface of the front left end of 26 on the side adjacent to 18. The function of peg 34 is to help a user to accurately indicate the relative inclination of 26 against graduations 24. This relative inclination can also be observed using simpler means such as grooves or markings on the outer surface of 26 adjacent to dial 18.

A partially hollowed out conventional planar circular protractor 40 having graduations is permanently affixed on support member 12L. The diameter of protractor 40 is relatively smaller than the diameter of dial 18. It is attached such that its diametric center is concentric to dial 18. This arrangement enables a user to find the aid's resting or carrying plane's inclination and its relative inclination to dial 18.

A tape measure 42, with a tape line 44 extending out of 42 is mounted upright on support 12R using bracket 48 which is adhesively attached to the support member. It can also be mechanically fixed to support 12R. The tape measure is mounted such that tape line 44 is able to extend out in front of system 10 and without interfering with any other parts, especially any other moving parts of the preferred embodiment. This provides a user of system 10 the means to measure the distance between system 10, and a target of interest at a reasonable distance.

Figure 2:
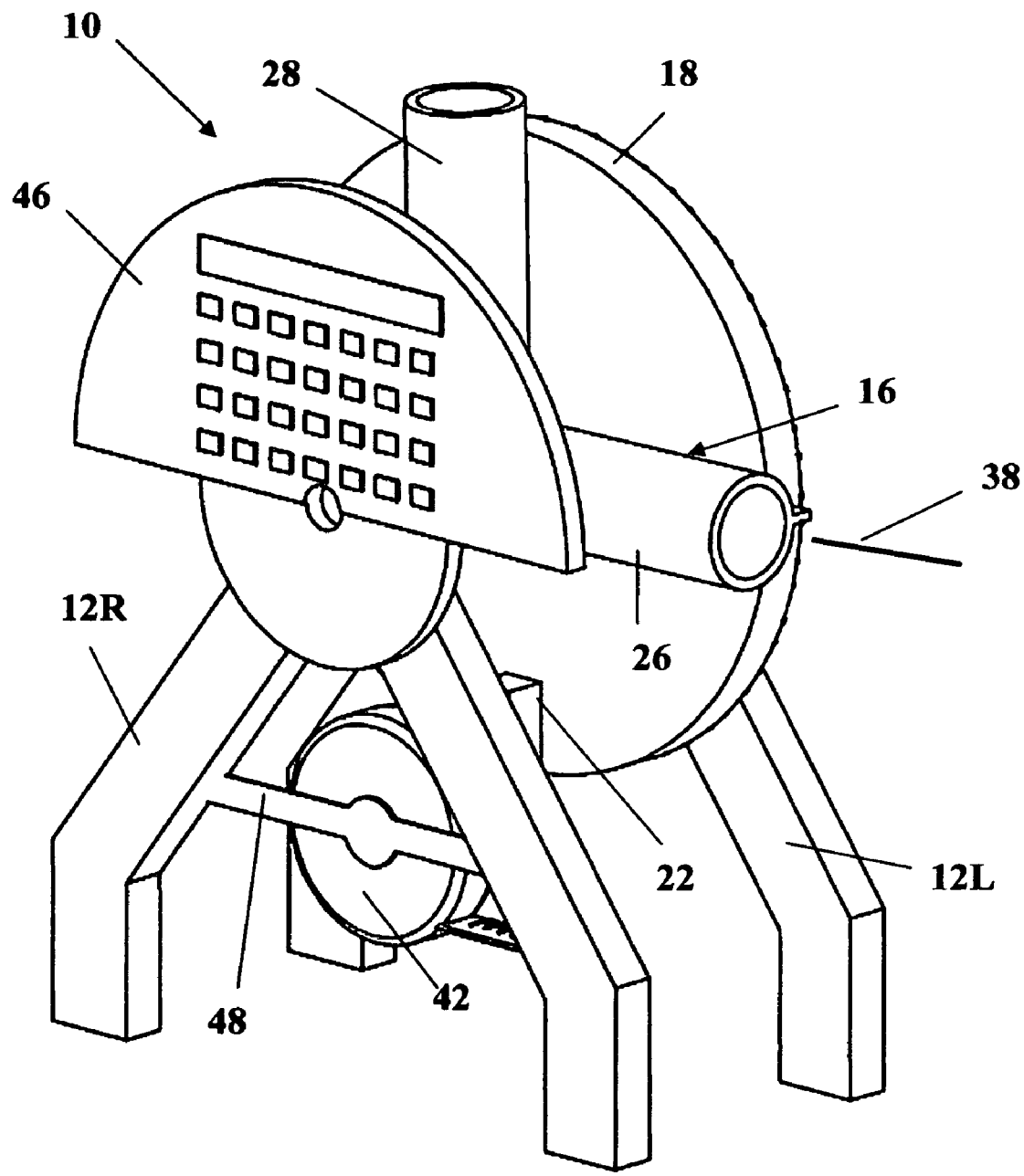
FIG. 2 shows the right orthogonal view of the system.

With reference to FIG. 2, a small conventional semi-circular framed electronic arithmetic calculator 46 is adhesively attached on support member 12R. The calculator enables a user to conduct arithmetic calculations with observed angular inclinations of scope 16, against dial 18 and the distance measured using tape measure 42. With the help of a trigonometric table (not shown) and system 10 a user can conduct trigonometric calculations on real life objects. The teaching system 10 may be used in indoor and outdoor settings.

Figure 8:
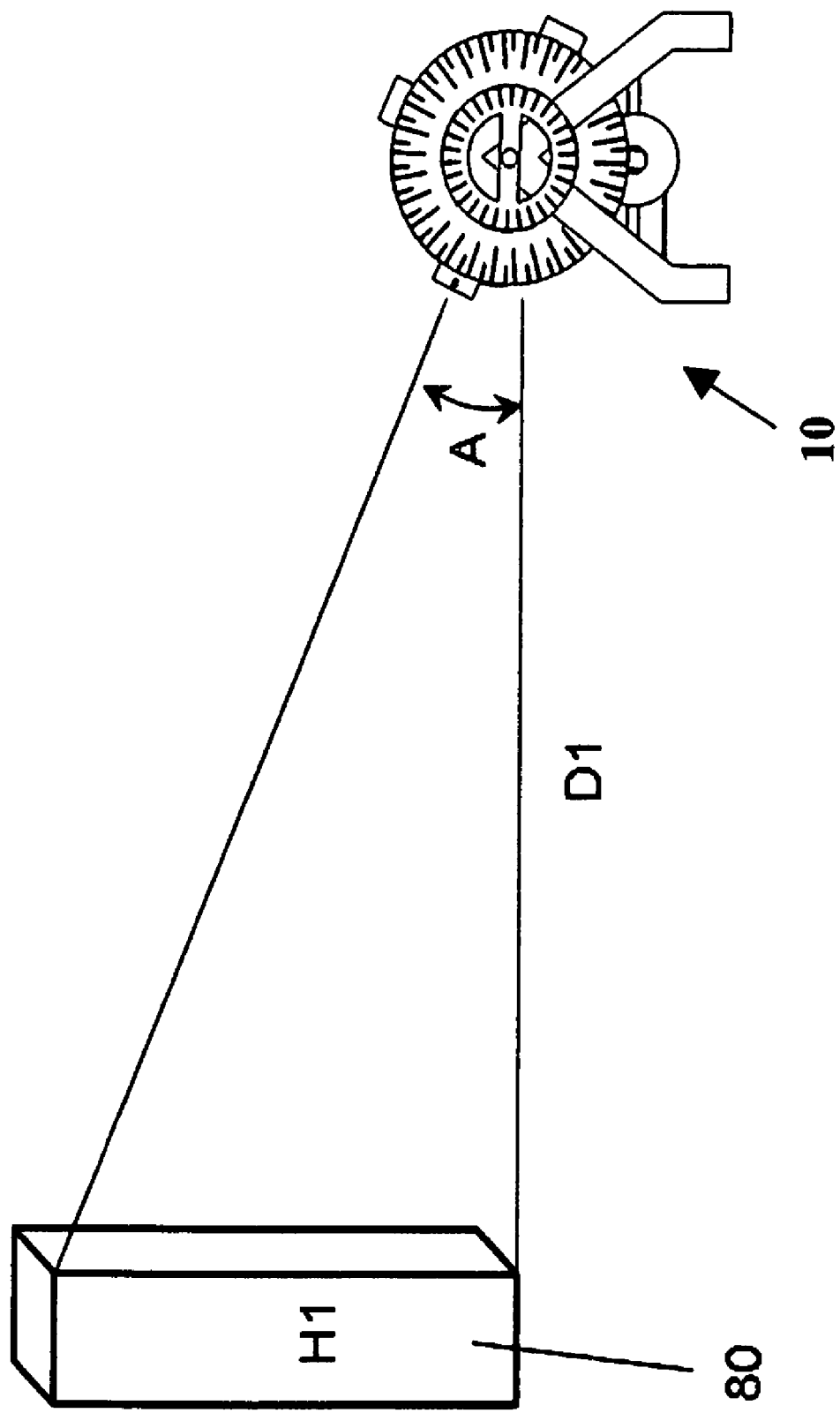
FIG. 8 shows a simple illustration of application of the system.
Figure 9:
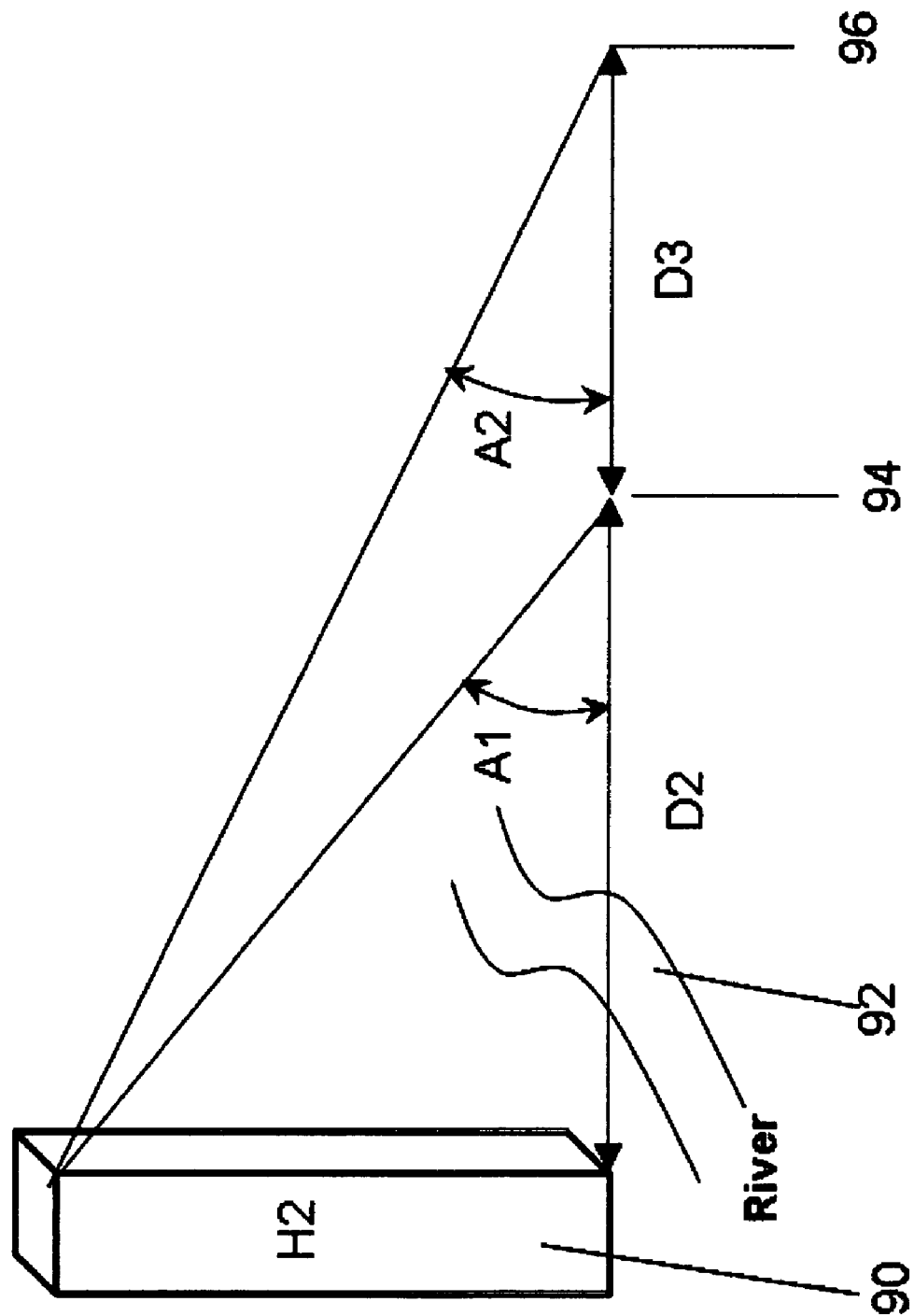
FIG. 9 shows a complex illustration of application of the system.

Operation-FIGS. 8,9

Use of the teaching system is preferably in conjunction with trigonometric formulas booklet. To explain the operation of the system, a simple determination of vertical height of an object 80 from ground level is used as illustrated in FIG. 8. The system 10 is either placed on ground or held at a stable plane, and whose height from ground level is known. The distance "D1" between the object and the system is measured using tape measure 42. Next, scope 16 is rotated to view the top of the object and the angle of upward inclination angle "A" is recorded by noting the graduation 24 on gravity dial 18 against peg 34.

Using learned trigonometric functions, the user can determine the vertical height "H1" of the object. For this example, the user can obtain the height of the object by multiplying the trigonometric tangent value of the measured inclination angle "A" with the measured distance "D1" using calculator 46 and find the overall vertical height "H" of the object. To get an accurate measurement the height of system 10 from the ground is added to the final height calculations.

For advanced level users, a more complex application of system 10 is possible, where direct measurements are not convenient. The height of an object may also be determined with the teaching aid system where direct measurement to the object is not possible, for instance as shown in FIG. 9 wherein the building 90 with height "H2" is separated from the view location by a river 92 or other barrier. Therein, an initial location 94 is selected and marked. Following the above procedures, the angle "A1" between the top on bottom of the building 90 is determined and the unknown distance between system and object is noted as "D2". Thereafter, the system 10 is moved further back to get a second inclination angle "A2" at location 96 which is recorded and the distance "D3" between initial location 94 and final location 96 is measured using tape measure 42. By applying trigonometric formulation we know that Tan (A1)=H2/D2 and Tan (A2)=H2/(D2+D3). Next partially solving the first equation for D2 and substituting it in the second equation to solve H2 will result with the height of the building. The known height of the system 10 from the ground or resting plane must be added to get an accurate measurement of the height of the object.

ADVANTAGES

From the description above, a number of advantages of my trigonometry teaching aid system become evident, the significant advantages being:
(a) Ease of use.
(b) A single stand-alone comprehensive tool for understanding and applying trigonometric principles in real life, when used in combination with a trigonometry formula table.
(c) A fun way to learn trigonometry by measuring real life objects.
(d) No-setup is required to measure the true horizontal and vertical angles.
(e) Due its application spectrum it can be used as a educational toy, educational device, school classroom assistive tool, and as an engineering scientific measurement tool.

DESCRIPTION OF THE ALTERNATIVE EMBODIMENT

The teaching aid system 10 may also be provided in simpler formats, for instance an alternate embodiment is shown in FIG. 7. In this alternate embodiment the scope is simplified. Scope 50 shown in FIG. 7, comprises of a single hollow tube and no additional mating tubes. Since it has no mating tube to branch the image beam passing through it, it is also void of the need of having an image branching medium. Lastly, the alternate embodiment also does not house the only electronic component in the aid, which is the electronic arithmetic calculator. All other elements are the same as the preferred embodiment.

I claim:

1. A trigonometry teaching aid system for providing young adults with real world applications for applying the principles of trigonometry comprising of:
a plurality of planar forked support members, a cylindrical hole on the upper end of each of said support members,
a scope having at least one elongated hollow primary tube, a cylindrical solid shaft; transversally extending out of said tube and pivotally joining to said cylindrical holes,
a asymmetrically weighing gravity dial, a hole on said gravity dial's diametric center, said dial pivotally and coaxially connecting to said shaft via said hole, scaling graduations radially positioned on said dial's outer surface,
means for enabling said gravity dial to reproducibly orient itself under the influence of gravity; whereby true horizontal and vertical ,angulations can be determined, including having scaling graduations radially positioned on said dial's surface, and having an asymmetrical weight distribution on said gravity dial when pivoting freely about its diametric center.

2. The teaching aid system as recited in claim 1, further including an electronic arithmetic calculator attached on the upper outer surface of one of said support members without hindering movement of any moving elements; to enable a user of said aid system to conduct arithmetic computations.

3. The teaching aid system as recited in claim 1, further including a secondary tube perpendicularly joining to at least one said primary tube, an image branching medium inserted and canted in said primary tube at the joining of said secondary tube; whereby an image light beam passing through said primary tube is incident on said medium and is optically branched to said secondary tube.

4. The teaching aid system as recited in claim 3, wherein the image branching medium is made of a semi-reflective glass sheet.

5. The teaching aid system as recited in claim 1 further including a peg attached on the outer surface of said primary tube to denote angle of inclination of said primary tube relative to said scaling graduations on said dial.

6. The teaching aid system as recited in claim 1 further including means for measuring the distance between said aid system and a desired point of interest including a tape measure, a bracket, said tape measure is attached to said bracket, and is connected to one of said support members without hindering movement of any pivoting elements to enable distance measurement on said system; whereby distance from said system to a target of interest can be measured, and angles of inclinations determined using said system is used in conjunction with trigonometric tables to determine physical measurements.

7. A trigonometry teaching aid system for providing young adults with real world applications for applying the principles of trigonometry comprising of:

a plurality of planar forked support members, a cylindrical hole on the upper end of each of said support members, a scope having at least one elongated hollow tube, a cylindrical solid shaft transversally extending out of said tube and pivotally joining to said cylindrical holes, first means to allow 360 degree swivel of said scope, including pivotally connecting said shaft to said cylindrical holes in said support members, an asymmetrically weighing gravity dial, a hole on said dial's diametric center, and said dial pivotally and coaxially connecting to said shaft via said hole, second means for enabling said dial to reproducibly orient itself under the influence of gravity whereby true horizontal and vertical angulations can be determined, third means for measuring the distance between said aid system and a desired point of interest, including having a tape measure mounted on at least one of said support members without hindering movement of any moving elements.

8. The teaching aid system as recited in claim 7 further including a conventional protractor permanently disposed on one of said support members and coaxially arranged to said dial to guide measurement of angulations relative to said aid system's resting plane.

* * * * *